US007881207B2

United States Patent
Dunbar (10) Patent No.: US 7,881,207 B2
(45) Date of Patent: Feb. 1, 2011

(54) METHOD AND SYSTEM FOR LOOP-BACK AND CONTINUE IN PACKET-BASED NETWORK

(75) Inventor: Linda Dunbar, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 584 days.

(21) Appl. No.: 11/368,024

(22) Filed: Mar. 2, 2006

(65) Prior Publication Data
US 2007/0115838 A1 May 24, 2007

Related U.S. Application Data

(60) Provisional application No. 60/735,953, filed on Nov. 10, 2005.

(51) Int. Cl.
*H04J 1/16* (2006.01)
(52) U.S. Cl. ...................................... 370/241
(58) Field of Classification Search ............. 370/241.1, 370/244, 245, 248, 249
See application file for complete search history.

(56) References Cited

U.S. PATENT DOCUMENTS

| 6,278,718 | B1 | | 8/2001 | Eschholz | |
|---|---|---|---|---|---|
| 6,363,056 | B1 | | 3/2002 | Beigi et al. | |
| 7,031,304 | B1 | * | 4/2006 | Arberg et al. | 370/360 |
| 2004/0078483 | A1 | * | 4/2004 | Simila et al. | 709/238 |
| 2004/0213232 | A1 | * | 10/2004 | Regan | 370/390 |
| 2005/0099951 | A1 | * | 5/2005 | Mohan et al. | 370/241 |
| 2005/0259589 | A1 | | 11/2005 | Rozmovits et al. | |

FOREIGN PATENT DOCUMENTS

| CN | 1196852 A | 10/1998 |
|---|---|---|
| JP | 2000232448 A | 8/2000 |
| WO | 02091642 A2 | 11/2002 |

OTHER PUBLICATIONS

Foreign Communication From a Related Counterpart Application—European Supplementary Search Report, EP 06805202.6, Apr. 24, 2009, 7 pages.

(Continued)

*Primary Examiner*—Chirag G Shah
*Assistant Examiner*—Amarnauth Persaud
(74) *Attorney, Agent, or Firm*—Conley Rose, P.C.; Grant Rodolph (57) ABSTRACT

According to an embodiment, the present invention provides a method for transferring data in a packet-based network. The method includes a step for receiving at least a first data frame. The first data frame is associated with a first origination node and a first destination node. The method includes a step for processing information associated with the first data frame. The method includes a step for determining whether the first data frame satisfies at least one predetermined condition based on at least information associated with the first data frame. If the first data frame is determined to satisfy the at least one predetermined condition, the method includes a step for providing a second data frame based on at least information associated with the first data frame, where the second data frame is associated with a second origination node and a second destination node.

55 Claims, 5 Drawing Sheets

OTHER PUBLICATIONS

Foreign Communication From a Related Counterpart Application—International Search Report and Written Opinion, PCT/CN2006/003007, Feb. 15, 2007, 8 pages.

Metro Ethernet Forum, "Ethernet Local Management Interface (E-LMI)," Technical Specification, MEF 16, Jan. 2006, 41 pages.

Srisuresh, P., et al. "IP Network Address Translator (NAT) Terminology and Considerations," NAT Working Group, Internet Draft, draft-ietf-nat-terminology-03.txt, Jun. 1999, 26 pages.

Srisuresh, P., et al. "Traditional IP Network Address Translator (Traditional NAT)," Network Working Group, RFC 3022, Jan. 2001, 17 pgs.

IEEE, 802.3ah/2005, "Information Technology- Telecommunications and Information Exchange Between Systems-Local and Metropolitan Area Networks- Specific Requirements- Part 3: Carrier Sense Multiple Access with Collision Detection (CSMA/CD) Access Method and Physical Layer Specifications," IEEE Computer Society, 417 pages.

IEEE Draft, P802.1ag/D4.1, "Draft Standard for Local and Metropolitan Area Networks- Virtual Bridged Local Area Networks- Amendment 5: Connectivity Fault Management," IEEE Computer Society, Aug. 18, 2005, 188 pages.

Foreign Communication From a Related Counterpart Application—European Examination Report, EP 06805202.6, Oct. 22, 2009, 9 pages.

* cited by examiner

Figure 1B

Figure 2 Network Perspective

Figure 3 Node Perspective

Figure 4

METHOD AND SYSTEM FOR LOOP-BACK AND CONTINUE IN PACKET-BASED NETWORK

CROSS-REFERENCES TO RELATED APPLICATIONS

This application claims priority to U.S. Provisional Application No. 60/735,953, filed Nov. 10, 2005, which is incorporated by reference herein.

BACKGROUND OF THE INVENTION

This invention relates to communication networks. More particularly, the present invention provides a technique, including a method and system, for loop-back and continue in a packet-based network. Specifically, the present invention provides a tool for fault diagnostics and fault isolation in a packet-based network. As merely an example, the present invention is implemented as a data driven and data dependent diagnostic tool; however, it would be recognized that the present invention has a much broader range of applicability.

Communication network systems can be traced back for many years. The development of communication techniques has been an important aspect for the development of human civilization. Thousands of years ago, people developed schemes for using relayed smoke signals to communicate information over long distances. In the past two hundred years with the advent of industrial revolution, numerous techniques have been developed to communicate information using electrical energy. For example, in a communication technique known as telegraph, information is communicated over long distances in a form of electrical "dots" or "pulses". Over the years, telephone, which allows two or more people to "talk" to each other over long distances, has developed and gradually replaced the telegraph.

More recently, new communication techniques have been developed for transferring data over communication networks by way of network devices, such as routers, switches, etc. Many communication techniques, implemented by various systems and methods, have been developed. For example, circuit switching network systems and methods have been used for many years. In the recent years, with the size of data being transferred increasing dramatically, packet switching network systems are becoming more common. In some instances, circuit switching and packet switching networks are used together. In the past, circuit switching networks, which require the establishment of dedicated point-to-point connections, were used for transferring information. Circuit switching networks, partly due to its requirement for dedicated connections, sometimes lack flexibility to provide quality of service attributes that are required for data transferring. Depending upon applications, a packet-based network offers better flexibility. In a packet-based network, no dedicated point-to-point connection is required. Instead, each packet of a single message in a packet-based network contains a destination address and can be dynamically routed via different network path. Sometimes, a network transfers packet data in the format of frames. For example, Internet Protocol ("IP") packets may be too large to transfer, and are thus sent as frames, each of the frames containing information related to transferring.

One of the common goals in most communication networks has been to improve quality of service. For example, quality of service includes speed, reliability, etc. To improve the quality of service, a variety of techniques have been developed, which include diagnostic tools. For circuit switching networks, a conventional loop-back technology is used to diagnose faults in networks. For packet-based networks, conventional techniques, such as "Ping", have been used to monitor connectivity among nodes, but have often failed to monitor the quality of connectivity. As a result, conventional techniques as described above are often inadequate for fault detection and isolation in packet-based networks.

Therefore, it is desirable to have an improved system and method for diagnosing and isolating faults in packet-based networks.

BRIEF SUMMARY OF THE INVENTION

This invention relates to communication networks. More particularly, the present invention provides a technique, including a method and system, for loop-back and continue in a packet-based network. Specifically, the present invention provides a tool for fault diagnostics and fault isolation in a packet-based network. As merely an example, the present invention is implemented as a data driven and data dependent diagnostic tool; however, it would be recognized that the present invention has a much broader range of applicability.

According to an embodiment, the present invention provides a method for transferring data in a packet-based network (e.g., Ethernet). For example, the method is for diagnosing faults in packet-based networks. The method includes a step for receiving at least a first data frame. The first data frame is associated with a first origination node and a first destination node. The method additionally includes a step for processing information associated with the first data frame. The method also includes a step for determining whether the first data frame satisfies at least one predetermined condition based on at least information associated with the first data frame. If the first data frame is determined to satisfy the at least one predetermined condition, the method includes a step for providing a second data frame based on at least information associated with the first data frame, where the second data frame is associated with a second origination node and a second destination node. The method also includes a step for sending the second data frame to the second destination node. The first destination node and the second destination node are different.

According to an alternative embodiment, the present invention provides a method for transferring data in a packet-based network. The method includes a step for receiving at least a first data frame by a first node directly from a second node. The method also includes a step for processing information associated with the first data frame at the first node. The method additionally includes a step for providing a second data frame based on at least information associated with the first data frame at the first node. Additionally, the method includes a step for sending the second data frame from the first node directly to a third node. Moreover, the method includes a step for sending the first data frame from the first node directly to a fourth node. According to an embodiment, the third node is different from the second node.

According to yet another embodiment, the present invention provides a packet-based network. The packet-based network includes, among other things, a node configured to receive at least a first data frame. The first data frame is associated with a first origination node and a first destination node. The node is also configured to process information associated with the first data frame. The node is additionally configured to determine whether the first data frame satisfies at least one predetermined condition based on at least information associated with the first data frame. If the first data frame is determined to satisfy the at least one predetermined condition, the node generates a second data frame based on at least information associated with the first data frame. The second data frame is associated with a second origination node and a second destination node. The node, upon satisfying the condition, also sends the second data frame to the second destination node. The first destination node and the second destination node are different.

According to yet another embodiment, the present invention provides a communication device including a computer-readable medium, which includes instructions for transferring data in a packet-based network. The communication device product includes one or more instructions to be executed by a processor. The communication device includes one or more instructions, which include codes for receiving at least a first data frame. The first data frame is associated with a first origination node and a first destination node. The communication device includes one or more instructions, which include codes for processing information associated with the first data frame. The communication device includes one or more instructions, which additionally include codes for determining whether the first data frame satisfies at least one predetermined condition based on at least information associated with the first data frame. Additionally, the communication device includes one or more instructions which include codes for providing a second data frame based on at least information associated with the first data frame, where the second data frame is associated with a second origination node and a second destination node, and sending the second data frame to the second destination node, under the condition that if the first data frame is determined to satisfy the at least one predetermined condition. The first destination node and the second destination node are different.

According to yet another embodiment, the present invention provides a packet-based network. The network includes a first node configured to send at least a first data frame. The network also includes a second node. The second node is configured to receive at least the first data frame directly from the first node. The second node is also configured to process information associated with the first data frame. The second node is additionally configured to provide a second data frame based on at least information associated with the first data frame. Moreover, the second node is configured to send the first and the second data frame. The network also includes a third node configured to receive the second data frame directly from the second node. The network additionally includes a fourth node configured to receive the first data frame directly from the second node. The third node is different from the first node.

According to yet another embodiment, the present invention provides a communication device. For example, the communication device is a router or a network switch. The communication device includes a hardware component and a software component. The software component includes instructions for transferring data in a packet-based network. The software component includes one or more instructions for receiving at least a first data frame, the first data frame being associated with a first origination node and a first destination node. The software component also includes one or more instructions for processing information associated with the first data frame. The software component additionally includes one or more instructions for determining whether the first data frame satisfies at least one predetermined condition based on at least information associated with the first data frame. The software component also includes one or more instructions for providing a second data frame based on at least information associated with the first data frame if the first data frame is determined to satisfy the at least one predetermined condition, the second data frame being associated with a second origination node and a second destination node. In addition, the software component also includes one or more instructions for sending the second data frame to the second destination node. The first destination node and the second destination node are different.

According to yet another embodiment, the present invention provides a communication program product including a computer-readable medium including instructions for transferring data in a packet-based network. The communication program product includes one or more instructions to be executed by a processor. The communication program product includes one or more instructions for receiving at least a first data frame by a first node directly from a second node. The communication program product includes one or more instructions for processing information associated with the first data frame at the first node. The communication program product includes one or more instructions for providing a second data frame based on at least information associated with the first data frame at the first node. The communication program product includes one or more instructions for sending the second data frame from the first node directly to a third node. Additionally, the communication program product includes one or more instructions for sending the first data frame from the first node directly to a fourth node. The third node is different from the second node.

It is to be appreciated that the present invention provides various advantages over conventional techniques. According to certain embodiments, a packet-based network continues its normal operations when a loop-back operation is performed. For example, the original destination node receives forwarded frames as a part of the normal network transferring operation. As a result, the destination node continues to operate as normal while diagnostics are performed at the diagnostic node. According to an embodiment, loop-back frames are forwarded to a diagnostic node that is capable of performing detailed diagnostics. For example, compared to typical "Ping" method used in packet-based network, the present invention provides a tool that makes more efficient debugging. For example, a diagnostic node is a computer workstation that is designed to analyze frames of data and network payload. According to an embodiment, the present invention allows selective loop-back of frames as opposed to the loop-back of all frames. It is to be appreciated that that present invention may be adopted for different types of packet-based networks, such as Ethernet, wide area network, and the Internet.

Depending upon embodiment, one or more of these benefits may be achieved. These benefits and various additional objects, features, and advantages of the present invention can be fully appreciated with reference to the detailed description and accompanying drawings that follow.

DETAILED DESCRIPTION OF THE INVENTION

This invention relates to communication networks. More particularly, the present invention provides a technique, including a method and system, for loop-back and continue in a packet-based network. Specifically, the present invention provides a tool for fault diagnostics and fault isolation in a packet-based network. As merely an example, the present invention is implemented as a data driven and data dependent diagnostic tool; however it would be recognized that the present invention has a much broader range of applicability.

As mentioned above, there are various techniques for monitoring and trouble shooting faults in a network system. For example, in a circuit switching network, a conventional loop-back technology is used to improve the quality of service. For packet-based networks, conventional techniques such as "Ping" have been used to improve and monitor the quality of service. The "Ping" technique has been effective in determining connectivity, but it does not provide a way to locate problematic network nodes or segments. For example, the "Ping" technique does not provide for detecting difficult faults such as packets dropping along its way, or certain flow of frames cannot be transported as effectively as others because of firewall, misconfiguration, network congestion, etc. As a result, conventional techniques as described above are often inadequate for fault detection in packet-based networks.

For example, "ping" is one of the common techniques used in packet network as a diagnostic tool. "Ping" provides a basic test of whether a particular host is reachable on the network from the testing host. For example, "ping" provides estimates of the round-trip time and connectivity among hosts. It works by sending an "echo request" packet to the target host and listening for replies. "Ping" is an effective technique for detecting connectivity failure. Unfortunately, "ping" is generally not a useful tool for detecting payload related network failures such as bandwidth issues, etc.

One of the techniques for detecting payload related network failures has been a payload loop-back scheme. Conventionally, the payload loop-back scheme is used in a circuit switching network. For example, each port in the circuit switching network can be instructed to loop-back an entire payload from the receiving link to the transmission link. Each port can also be instructed to bridge the entire payload to the original forwarding link.

The payload loop-back scheme has recently been used in packet-based networks as well. For example, under the IEEE 802.3ah standard, a general technique for payload loop-back is outlined. The technique for payload loop-back often requires looping back all frames without changing anything within the frames, making this type of loop-back operate in substantially the same way as certain circuit based loop-back. The term "frame", means, for example, encapsulated data units that include origination and destination address, which should not unduly limit the scope of claims. While IEEE 802.3ah provides an improvement over previous techniques, its loop-back scheme has certain drawback and limitations. For example, the IEEE 802.3ah loop-back scheme often works on only one single Ethernet link and usually does not allow the destination node to receive any data packets or frames. In addition, the IEEE 802.3ah loop-back scheme does not work with multiple links. That is, a node that is immediately adjacent to the loop-back node has to process all the frames looped back without forwarding them. During the loop-back period, none of loop-back frames are forwarded to their destination nodes.

Conventional payload loop-back schemes, both under the circuit switching network and IEEE 802.3ah standard, often disrupt and slow down communication networks. For example, loop-back frames are sent to the first node adjacent to the loop-back node (e.g., IEEE 802.3ah scheme) or back to the originating node (e.g., as in circuit switching loopback scheme), and the destination node does not receive the loop-back frames. As a result, the originating node and the destination node often have to stop their normal operations during loop-back operations.

It is therefore to be appreciated that according to certain embodiments, the present invention provides an improved technique for payload "loop-back" operation in a packet-based network. According to an embodiment, a loop-back node provides loop-back while continuing to send frames to their destination nodes. In addition, loop-back frames or packets can be sent to any nodes (e.g., the origination node or a third-party node).

Figure 1A:
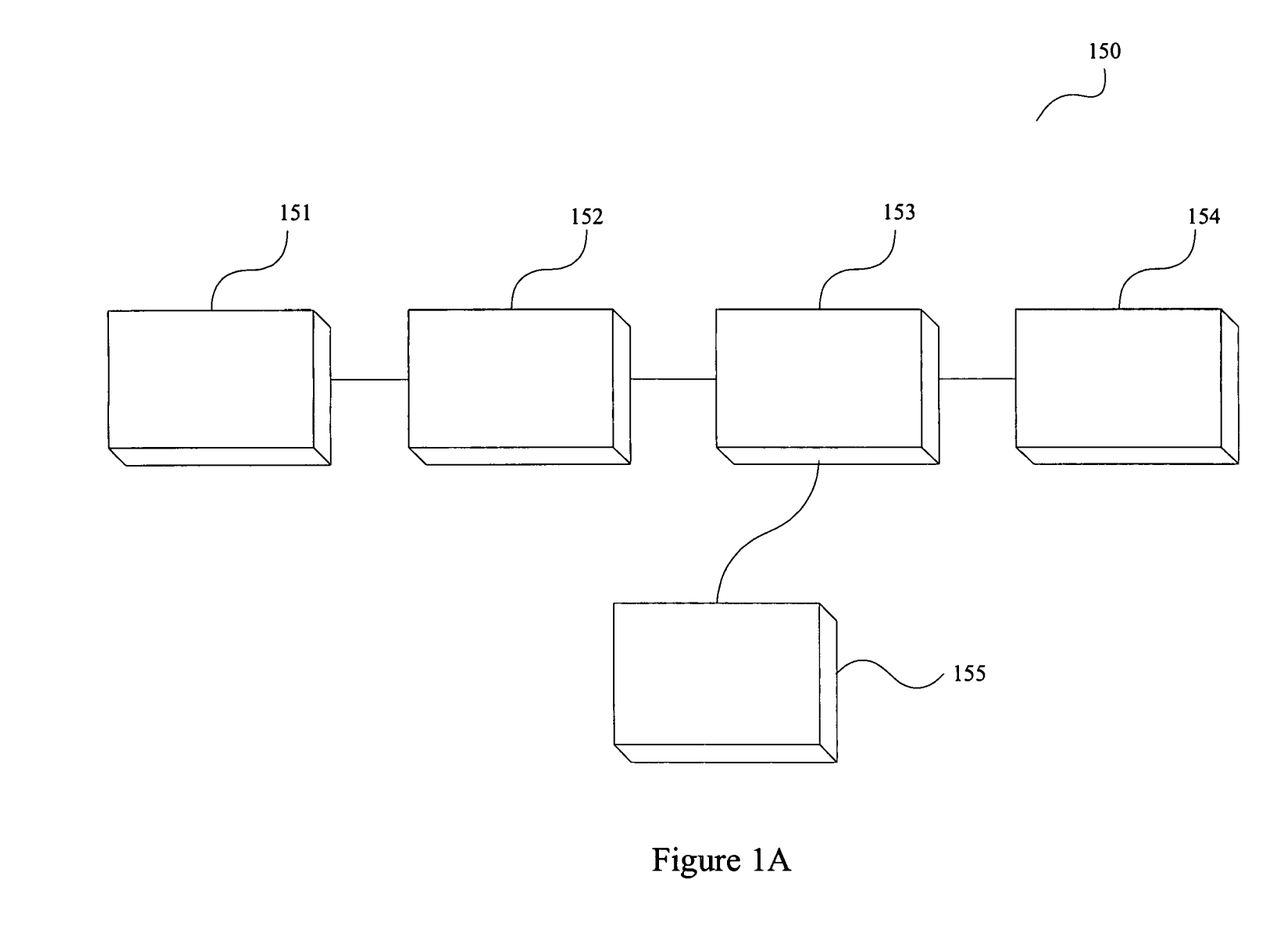
FIG. 1A is a simplified diagram illustrating a packet-based network based on an embodiment of the present invention.

FIG. 1A is a simplified diagram illustrating a packet-based network based on an embodiment of the present invention. This diagram is merely an example, which should not unduly limit the scope of the claims. One of ordinary skill in the art would recognize many variations, alternatives, and modifications. As an example, the network 150 is a packet switched network that includes nodes 151-155. It is to be appreciated that the network 150 is merely an example, as the present invention can be implemented and utilized in other types of packet-based networks. According to certain embodiments, nodes 151-155 are network nodes whose purpose is to accept, route, and forward frames in a packet-based network, and there can be more or fewer nodes in the packet-based network. For example, at least one of the nodes 151-155 includes a communication device, such as a networking device. In another example, the networking device is a router or a switch.

Figure 2:
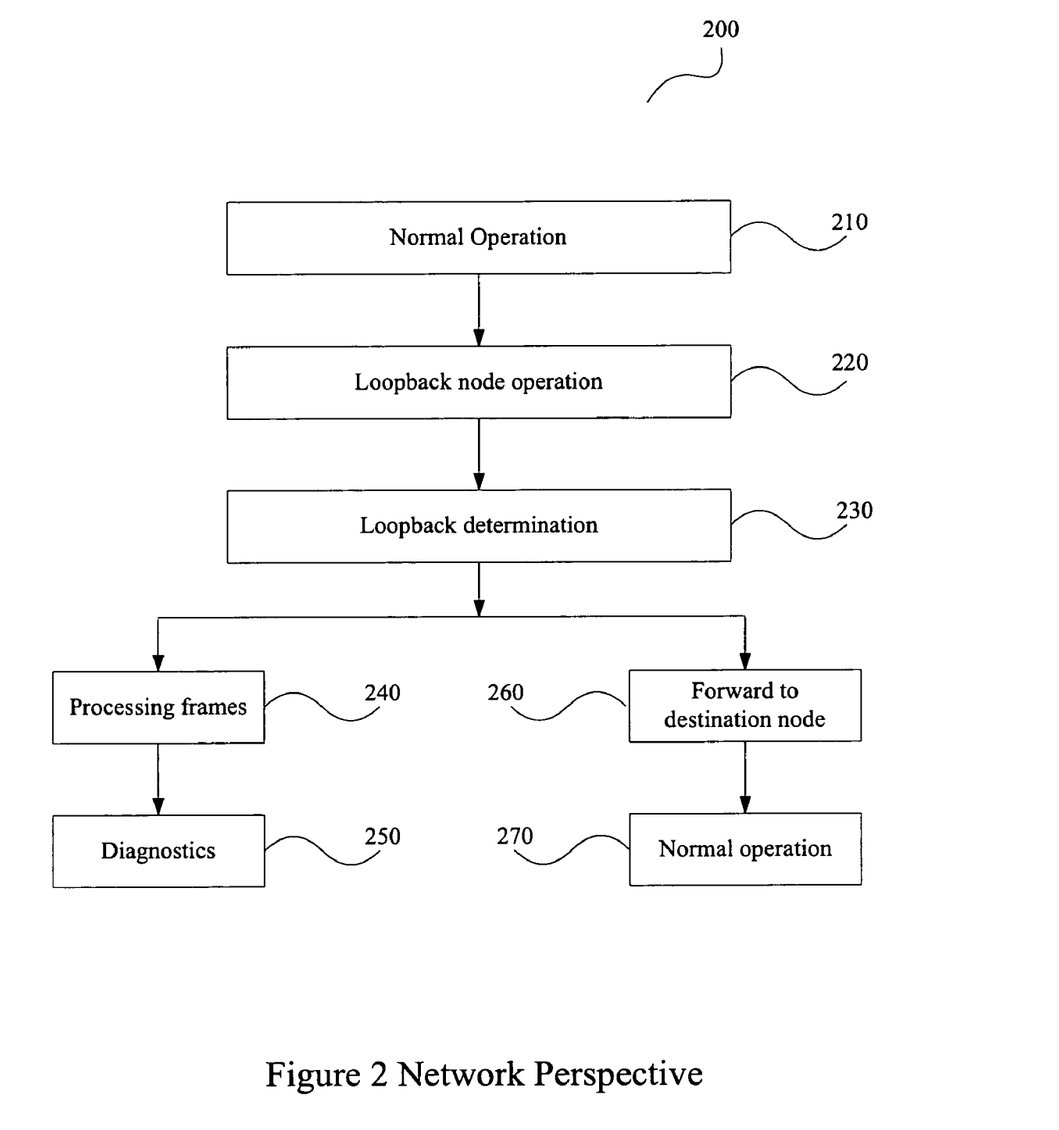
FIG. 2 illustrates a simplified block diagram of a flow chart according to an embodiment of the present invention.

FIG. 2 illustrates a simplified block diagram of a flow chart according to an embodiment of the present invention. This diagram is merely an example, which should not unduly limit the scope of the claims. One of ordinary skill in the art would recognize many variations, alternatives, and modifications. Depending upon certain embodiments, some of the steps on the flow chart can be skipped, removed, added, partially or wholly overlapped, or repeated. For example, some or all steps of the method 200 are performed by a network node (e.g., a router, network switch, etc.) or a processor directed by one or more codes. In another example, some or all steps of the method 200 are performed according to instructions included by a computer-readable medium in a communication or networking device.

The method 200 illustrates the operation of a packet-based network according to an embodiment of the present invention. As merely an example, the packet-based network is a wide area network, which can be, but not limited to, using Ethernet, TCP/IP, X.2.5, or frame relay protocols. Initially, the packet-based network performs normal operations, at step 210. For example, normal operations include receiving, processing, and transferring data. As an example, data being transferred are in the format of frames or data packets. For example, the operations at step 210 includes the node 151 sending out frames of data, which are routed through nodes 152 and 153 to reach node 154. Nodes 152 and 153 accept, route, and forward packets that eventually reach node 154. The node 154 reassembles the frames according to their appropriate sequence. Depending upon embodiments, packets of data may be divided or grouped into format of frames for the purpose of transferring.

During normal operations of the network 150, frames of data are sometimes routed through a "loop-back" node at step 220. For example, the loop-back node is node 153 in FIG. 1A. The node 153 receives frames of data originated from the node 151, routed through the node 152, and destined to route to node 154. As a part of operation, a loop-back node sometimes receives instruction from another node to perform loop-back operation on one or more frames that satisfy a predetermined condition. In one embodiment, the node 153 receives instruction from the origination node to loop certain frames to node 152 in order to determine whether there is any problem between the node 153 and the node 152. For example, the instruction for the loop-back operation can be provided by a source node sending a signal, a destination node sending a signal, or a network management system. In another example, the instruction can be provided automatically or manually.

After receiving frames of data, the loop-back node determines whether to loop back one or more frames of data at step 230. To provide an example, the node 153 receives instruction to loop back frames that originated from the node 152 at the step 220, and at step 230, processes and determines whether a frame is originated from node 152. If the frame is originated from the node 152, the node 153 commences the loop-back operation on this frame. If the frame is not originated from the node 152, the node 153 does not commence the loop-back operation on this frame. According to an embodiment, during the loop-back operation, the one or more frames of data are both looped back at step 240 and forward to their original destination node at step 260.

The loop-back node processes and loops back frames of data at step 240. According to various embodiments, the loop-back node does not need to send frame of data to their origination node. For example, the loop-back node sends frame of data to a diagnostic node instead of the origination node. It is to be appreciated that since the frames of data are not sent back to the origination node, the origination node can continue its normal operation while the diagnostic node performs error checking on the frames of data. As an example, the loop-back operation is illustrated at FIG. 1B.

Figure 1B:
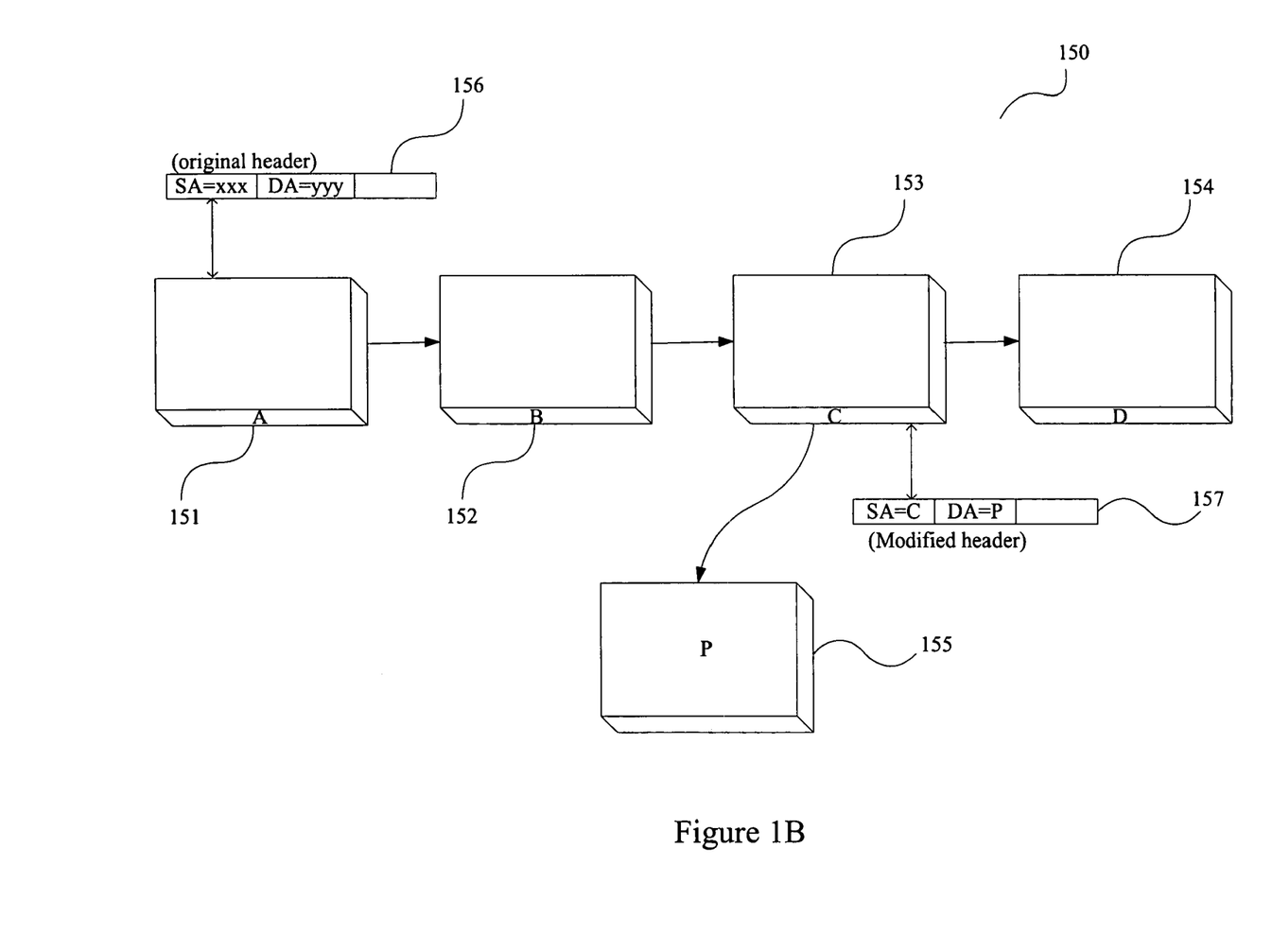
FIG. 1B is a simplified diagram illustrating a packet-based network performing loop-back operation based on an embodiment of the present invention.

FIG. 1B is a simplified diagram illustrating a packet-based network performing loop-back operation based on an embodiment of the present invention. This diagram is merely an example, which should not unduly limit the scope of the claims. One of ordinary skill in the art would recognize many variations, alternatives, and modifications. As an example, the network 150 is a packet switched network that includes nodes 151-155. It is to be appreciated that the network 150 is merely an example, as the present invention can be implemented and utilized in other types of packet-based networks. According to certain embodiments, nodes 151-155 are dedicated network nodes (e.g., routers, switches, etc.) whose purpose is to accept, route, and forward frames in a packet-based network, and there can be more or fewer nodes in the packet-based network.

As discussed above and further emphasized here, FIGS. 1A and 1B are merely examples, which should not unduly limit the scope of claims. One of ordinary skill in the art would recognize many variations, alternatives, and modifications. For example, the node 155 is a node that is different from any of the nodes 151, 152, 153, and 154. In another example, the node 155 is the same as the node 151. In yet another example, the node 155 is the same as the node 152. In yet another example, the node 155 is the same as the node 154. In yet another example, the node 155 is directly linked to the node 153. In yet another example, the node 155 is linked to the node 153 through one or more intermediate nodes. In one embodiment, the one or more intermediate nodes include one or more of the nodes 151, 152, and 154. In another embodiment, the one or more intermediate nodes do not include any of the nodes 151, 152, and 154.

According to an embodiment, at step 240, the node 153 acts as the loop-back node. As an example, the node 153 loops data in the format of frames to the node 155. According to various embodiments, the node 155 is the origination node, a different destination node, an intermediate node, or a diagnostic node. It is to be appreciated that, according to an embodiment, the node 153 does not have to send all frames (as compared to IEEE 802.3ah where all frames or packets are looped back) or packets of data to the node 155. This is possible because the node 153 modifies the routing attributes of the frames or packets that are to be looped back. For example, a frame contains a header 156 that specifies that the source address is "XXX" and the destination address is "YYY". When the node 153 receives the frame and performs the loop-back operation, the nodes 153 changes the source and destination addresses of the frame so that the frame is routed to the origination or diagnostic node. As merely an example, the node 153 modifies the header of the frame. The modified header 157 specifies that the node 153 is the origination node and the node 155 as the destination node. For example, the frames are identified in accordance with VLAN-id plus source MAC and/or destination MAC address in an Ethernet network. It is to be appreciated that according to an embodiment, the present invention allows a node to selectively loop-back (as opposed to looping back all frames as under IEEE 802.3ah loop-back scheme) frames to various destinations. According to certain embodiments, the frames that are being looped back are identified by indicators for a diagnostic node to distinguish. For example, a loopback frame is designated as a new type, such as EtherType in Ethernet Frames, for the node 155, and intermediate nodes if there are any intermediate nodes, to distinguish the loop-back frames from the data frames originated from the node 153. For example, loop-back frames are assigned with a unique OpCode, EtherType, or special encapsulation to distinguish the loop-back frames from regular data frames.

Frames of data are "looped back" to the node 155 at step 250. According to various embodiments, the node 155 can be the origination node, a different destination node, an intermediate node, or a diagnostic node. For example, the node 155 is the origination node which receives the loop-back frames and performs adjustments and diagnostics, accordingly. As another example, the node 155 is a diagnostic node that is specifically configured to perform various diagnostic functions, such as error checking, etc.

Now, referring back to step 230, it is to be appreciated that frames that are looped back are also forwarded to the original destination node. For example, frames that contain the header 156 are forwarded by node 153, which also performs loop-back operation. According to various embodiments, forwarding of frames is performed before, contemporaneously, during, or after looping back frames with modified headers. For example, frames with the destination address "YYY" are forwarded to the destination node "YYY" through nodes 153 and 154. It is to be appreciated that according to certain embodiments of the present invention, frames that are looped back are also forwarded to the original destination node. As a result, the destination node continues to operate as normal while diagnostics are performed at the diagnostic node. According to an embodiment, the modification of header does not change the underlying data content of frames.

As discussed above and further emphasized here, FIG. 2 is merely an example, which should not unduly limit the scope of claims. One of ordinary skill in the art would recognize many variations, alternatives, and modifications. According to various embodiments, various steps of method 200 may be added, removed, modified, replaced, overlapped, partially-overlapped, or repeated. For example, a network system stays at step 210 when no loop-back operation is performed. As another example, step 230 is removed so that the loop-back node always sends frames to the diagnostic node. As another example, step 240 starts when step 260 is halfway complete.

Figure 3:
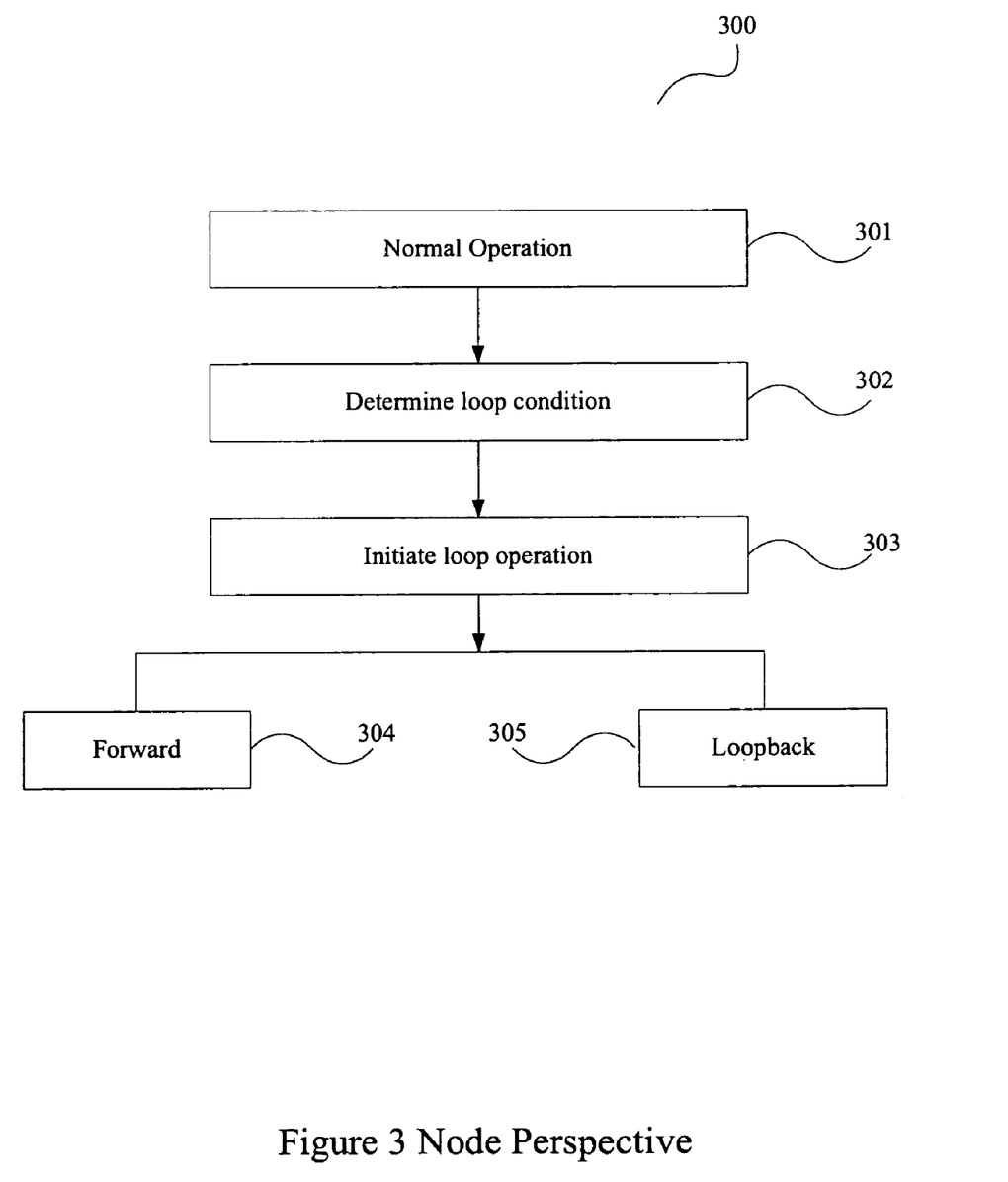
FIG. 3 illustrates a simplified block diagram of a flow chart for the operation of the loop-back node according to an embodiment of the present invention.

FIG. 3 illustrates a simplified block diagram of a flow chart for the operation of the loop-back node according to an embodiment of the present invention. This diagram is merely an example, which should not unduly limit the scope of the claims. One of ordinary skill in the art would recognize many variations, alternatives, and modifications. For example, some or all steps of the method 300 are performed by a computer or a processor directed by one or more codes. For example, a network node (e.g., router, switch, etc.) includes a process to execute functions directed by the one or more codes. In another example, some or all steps of the method 300 are performed according to instructions included by a computer-readable medium in a computer program product.

The method 300 illustrates the operation of a loop-back node according to an embodiment of the present invention. For example, the method 300 illustrates the operation of the node 153 from FIG. 1B. The node 153 performs normal operations, such as receiving and forwarding frames of data, at step 301. The node 153 determines whether to perform the loop-back operations, at step 302. For example, the node 153 detects an error from one of the received frames and initiates a loop-back mode for the purpose of diagnostics. As another example, the node 153 receives an instruction from a network server to perform scheduled diagnostics on frames being transferred. According to an embodiment, the node 153 initiates the loop-back operation when certain predetermined conditions are met. For example, the node 153 initiates the loop-back operation if the node 153 determines that one or more frames contain an origination or destination address that is the same as a predetermined node.

The node 153 initiates the loop-back operation at step 303. The node 153 may determine to loop back some or all of the frames. It is to be appreciated that, according to an embodiment, the node 153 does not have to loop back all frames (as compared to IEEE 802.3ah where all frames or packets are looped back). For example, the node 153 modifies the header of the frame, and the modified header 157 specifies that the node 153 is the origination node and the node 155 as the destination node.

At step 304, the node 153 forwards frames, which are also looped back at step 305, to their original destination address. For example, frames that contain the header 156 are forwarded by node 153, which also performs the loop-back operation. For example, frames with the destination address "YYY" are forwarded to the destination node "YYY" through nodes 153 and 154. It is to be appreciated that according to certain embodiments of the present invention, frames that are looped back are also forwarded to the original destination node. According to an example, the original destination node receives forwarded frames as a part of the normal network transferring operation. As a result, the destination node continues to operate as normal while diagnostics are performed at the diagnostic node.

At step 305, the loop-back operation is performed by the loop-back node. According to various embodiments, step 305 occurs before, contemporaneously, during, or after step 304.

As an example, the node 153 loops frames of data in the format of frames to the node 155. According to various embodiments, the node 155 is the origination node, a different destination node, an intermediate node, or a diagnostic node. It is to be appreciated that, according to an embodiment, the node 153 does not have to send all frames (as compared to IEEE 802.3ah where all frames or packets are looped back) or packets of data to the node 155. This is possible because the node 153 modifies the routing attributes of the frames or packets that are to be looped back. For example, a frame contains a header 156 that specifies that the source address is "XXX" and the destination address is "YYY". When the node 153 receives the frame and performs loop-back operation, the node 153 makes a copy of the frame and changes the source and destination addresses and/or data type (e.g., EtherType or OpCode) of the frame so that the frame is routed to the origination or diagnostic node. As merely an example, the node 153 modifies the header 156 of the frame. The modified header 157 specifies that the node 153 is the origination node and the node 155 as the destination node. It is to be appreciated that according to an embodiment, the present invention allows a node to selectively loopback (as opposed to looping back all frames as under IEEE 802.3ah loop-back scheme) frames to various destinations. According to certain embodiments, the frames that are being looped back are designated as a new type, such as EtherType in Ethernet Frames, for the node 155, and intermediate nodes if there are any intermediate nodes, to distinguish the loop-back frames from the data frames originated from the node 153.

As discussed above and further emphasized here, FIG. 3 is merely an example, which should not unduly limit the scope of claims. One of ordinary skill in the art would recognize many variations, alternatives, and modifications. According to various embodiments, various steps of method 300 may be added, removed, modified, replaced, overlapped, partially-overlapped, or repeated. For example, the node 153 stays at step 301 when no loop-back operation is performed. As another example, step 302 is removed so that the loop-back node always sends frames to the diagnostic node. As another example, step 304 starts when step 305 is halfway complete.

Figure 4:
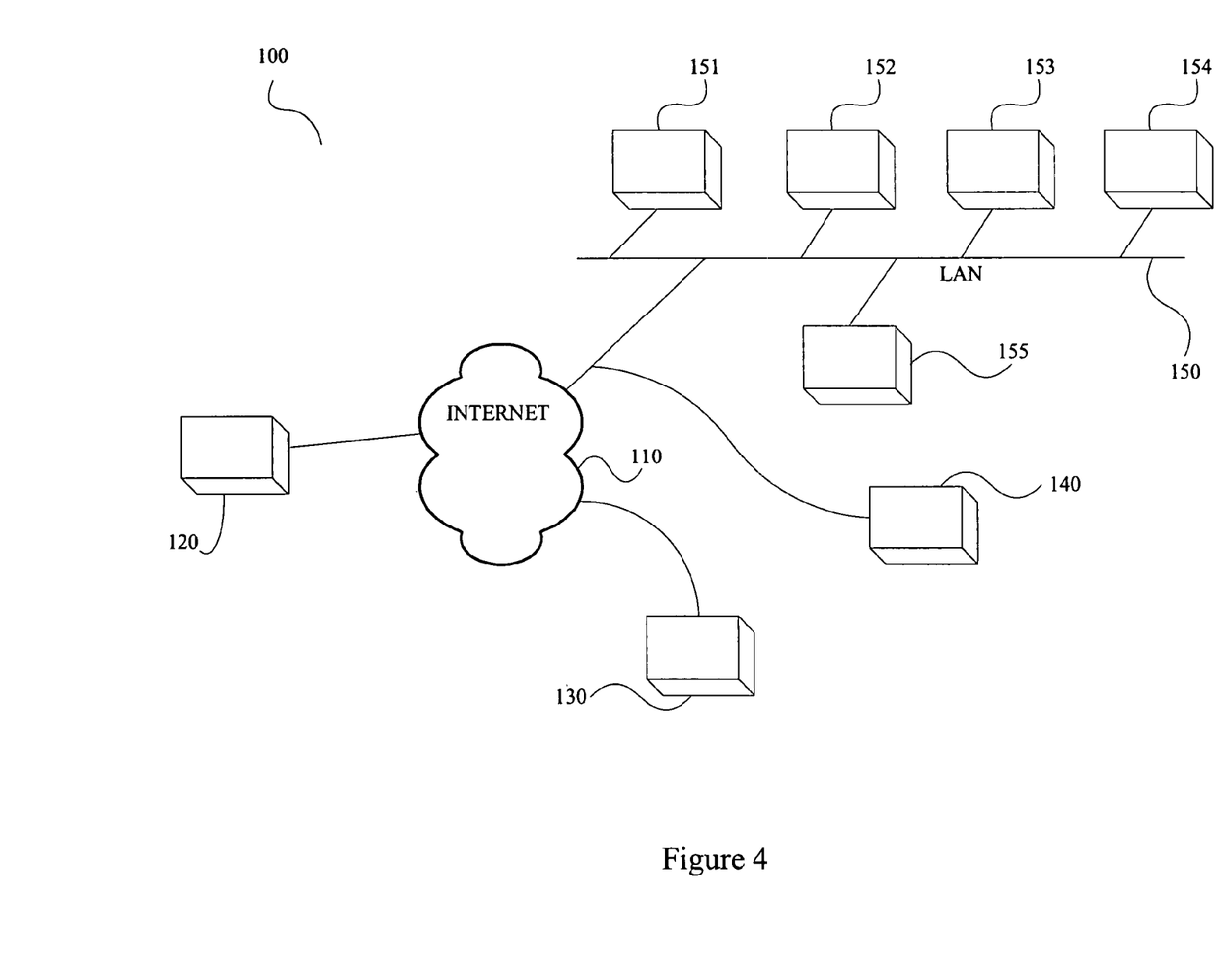
FIG. 4 is a simplified diagram illustrating a network system including an embodiment of the present invention.

It is to be appreciated that the present invention may be adopted for various types of packet-based networks. The network 150 can be a packet-based network of any type. For example, the network 150 is an Ethernet network, a wide area network, a local area network, ATM, FrameRelay, the Internet, or any combination thereof. As another example, FIG. 4 is a simplified diagram illustrating a network system including an embodiment of the present invention. This diagram is merely an example, which should not unduly limit the scope of the claims. One of ordinary skill in the art would recognize many variations, alternatives, and modifications. According to an embodiment, the network system 100 includes the Internet 110, nodes 120, 130, and 140, and the network 150 as a local area network, which includes nodes 151-154. For example, local area network 150 performs loop-back operations among its nodes 151-154 according to an embodiment of the present invention. The local area network 150 is connected to the Internet 110, which is also connected to the personal computer 120, the web server 130, and the workstation 140. As merely an example, the personal computer 120 uses is shares information with the local area network 150 through the Internet 110. The personal computer 120 connects to the Internet 110 using a dialup connection. The local area network 150 is connected to the Internet 110 via a broadband packet-based network connection.

According to an embodiment, the network 150 utilizes an improved payload loop-back system. For example, the improved payload loop-back system detects payload related network failures without disrupting normal network operations. It is to be appreciated that the network 150, with its payload loop-back system, is still compatible with other existing network technologies.

According to an embodiment, the present invention provides a method for transferring data in a packet-based network (e.g., Ethernet, or the Internet). The method includes a step for receiving at least a first data frame. For example, the first data frame includes first data. As merely an example, the first data frame is a part of a data packet. The first data frame is associated with a first origination node and a first destination node. The method additionally includes a step for processing information associated with the first data frame. The method also includes a step for determining whether the first data frame satisfies at least one predetermined condition based on at least information associated with the first data frame. If the first data frame is determined to satisfy the at least one predetermined condition (e.g., an address of the first origination node is the same as a predetermined address), the method includes a step for providing a second data frame (e.g., the second data frame includes second data that is the same as the first data, but the header of the first data frame is replaced by a new header) based on at least information associated with the first data frame, where the second data frame is associated with a second origination node and a second destination node. As merely an example, the second destination node is a diagnostic node. According to an embodiment, the first origination node and the second origination node are different. The method also includes a step for sending the second data frame to the second destination node. The first destination node and the second destination node are different. For example, the embodiment can be implemented in accordance with FIGS. 1-4.

It is to be appreciated that various steps may be added, modified, or removed. For example, the method may additionally include a step for sending the first data frame to the first destination if the first data frame is determined to satisfy the at least one predetermined condition. As merely an example, the method may include a step for sending the first data frame to the first destination node if the first data frame is determined not to satisfy the one predetermined condition. According to certain embodiments, the method also includes steps for receiving the second data frame at the second destination node and performing diagnostics to the second data frame at the second destination node. As merely an example, the method also includes steps for receiving the second data frame, processing information associated with the second data frame, and performing diagnostics to the first data frame based on at least information associated with the second data frame. Additionally, the method could also include steps for processing information associated with the second data frame and determining whether the second data frame includes at least one error.

As merely an example, the first data frame includes a first header, which includes a first source address, a first destination address, and a first indicator indicating the first data frame being a first frame type. The second data frame includes a second header, which includes a second source address, a second destination address, and a second indicator indicating the second data frame being a second frame type. For example, the first frame type and the second frame type are different, which can be distinguished by indicators (e.g., OpCode in an EtherType field).

As an example, source addresses are associated with nodes. For example, the first source address is associated with the first origination node. The first destination address is associated with the first destination node. The second source address is associated with the second origination node. The second destination address is associated with the second destination node. According to an embodiment, the first destination address and the second destination address are different. The first origination address and the second origination address are different.

According to an alternative embodiment, the present invention provides a method for transferring data in a packet-based network. The method includes a step for receiving at least a first data frame by a first node directly from a second node. The method also includes a step for processing information associated with the first data frame at the first node. The method additionally includes a step for providing a second data frame based on at least information associated with the first data frame at the first node. For example, the first data frame includes first data, the second data frame includes second data, and the first data and the second data are the same. Additionally, the method includes a step for sending the second data frame from the first node directly to a third node. Moreover, the method includes a step for sending the first data frame from the first node directly to a fourth node. For example, the third node is different from the fourth node, and the second node is different from the fourth node. According to an embodiment, the third node is different from the second node. For example, the embodiment can be implemented in accordance with FIGS. 1-3.

As an example, the first data frame includes a first header, which includes a first source address, a first destination address, and a first indicator indicating the first data frame being a first frame type. The second data frame includes a second header, which includes a second source address, a second destination address, and a second indicator indicating the second data frame being a second frame type. For example, the first frame type and the second frame type are different, which can be distinguished by indicators (e.g., OpCode in an EtherType field).

According to yet another embodiment, the present invention provides a communication device. For example, the communication device is a router or a network switch. The communication device includes a hardware component and a software component. The software component includes instructions for transferring data in a packet-based network. The software component includes one or more instructions for receiving at least a first data frame, the first data frame being associated with a first origination node and a first destination node. The software component also includes one or more instructions for processing information associated with the first data frame. The software component additionally includes one or more instructions for determining whether the first data frame satisfies at least one predetermined condition based on at least information associated with the first data frame. The software component also includes one or more instructions for providing a second data frame based on at least information associated with the first data frame if the first data frame is determined to satisfy the at least one predetermined condition, the second data frame being associated with a second origination node and a second destination node. In addition, the software component also includes one or more instructions for sending the second data frame to the second destination node. The first destination node and the second destination node are different. For example, the embodiment can be implemented in accordance with FIGS. 1-3.

According to yet another embodiment, the present invention provides a communication device. For example, the communication device is a router or a network switch. The communication device includes one or more components for transferring data in a packet-based network. The one or more components are configured to transfer data in a packet-based network and receive at least a first data frame, the first data frame being associated with a first origination node and a first destination node. Additionally, the one or more components are configured to process information associated with the first data frame, and to determine whether the first data frame satisfies at least one predetermined condition based on at least information associated with the first data frame. The one or more components are configured to provide a second data frame based on at least information associated with the first data frame if the first data frame is determined to satisfy the at least one predetermined condition, the second data frame being associated with a second origination node and a second destination node. Moreover, the one or more components are configured to send the second data frame to the second destination node. The first destination node and the second destination node are different. For example, the embodiment can be implemented in accordance with FIGS. 1-3.

According to yet another embodiment, the present invention provides a packet-based network. The packet-based network includes, among other things, a node configured to receive at least a first data frame. The first data frame is associated with a first origination node and a first destination node. The node is also configured to process information associated with the first data frame. The node is additionally configured to determine whether the first data frame satisfies at least one predetermined condition based on at least information associated with the first data frame. If the first data frame is determined to satisfy the at least one predetermined condition, the node generates a second data frame based on at least information associated with the first data frame. The second data frame is associated with a second origination node and a second destination node. The node, upon satisfying the condition, also sends the second data frame to the second destination node. The first destination node and the second destination node are different. For example, the embodiment can be implemented in accordance with FIGS. 1-3.

According to yet another embodiment, the present invention provides a communication device including computer-readable medium including instructions for transferring data in a packet-based network. The communication device includes one or more instructions to be executed by a processor. The communication device includes one or more instructions for receiving at least a first data frame. The first data frame is associated with a first origination node and a first destination node. The communication device includes one or more instructions for processing information associated with the first data frame. The communication device includes one or more instructions for determining whether the first data frame satisfies at least one predetermined condition based on at least information associated with the first data frame. Additionally, the communication device includes one or more instructions for providing a second data frame based on at least information associated with the first data frame, where the second data frame is associated with a second origination node and a second destination node, and sending the second data frame to the second destination node, under the condition that the first data frame is determined to satisfy the at least one predetermined condition. The first destination node and the second destination node are different. For example, the embodiment can be implemented in accordance with FIGS. 1-3.

According to yet another embodiment, the present invention provides a packet-based network. The network includes a first node configured to send at least a first data frame. The network also includes a second node. The second node is configured to receive at least the first data frame directly from the first node. The second node is also configured to process information associated with the first data frame. The second node is additionally configured to provide a second data frame based on at least information associated with the first data frame. Moreover, the second nodes are configured to send the first and the second data frame. The network also includes a third node configured to receive the second data frame directly from the second node. The network additionally includes a fourth node configured to receive the first data frame directly from the second node. The third node is different from the first node. For example, the embodiment can be implemented in accordance with FIGS. 1-3.

According to yet another embodiment, the present invention provides a communication program product including a computer-readable medium including instructions for transferring data in a packet-based network. The communication program product includes one or more instructions to be executed by a processor. The communication program product includes one or more instructions for receiving at least a first data frame by a first node directly from a second node. The communication program product includes one or more instructions for processing information associated with the first data frame at the first node. The communication program product includes one or more instructions for providing a second data frame based on at least information associated with the first data frame at the first node. The communication program product includes one or more instructions for sending the second data frame from the first node directly to a third node. Additionally, the communication program product includes one or more instructions for sending the first data frame from the first node directly to a fourth node. The third node is different from the second node. For example, the embodiment can be implemented in accordance with FIGS. 1-3.

It is to be appreciated that the present invention provides various advantages over conventional techniques. According to certain embodiments, a packet-based network continues its normal operations when a loop-back and continue operation is performed. For example, the original destination node receives forwarded frames as a part of the normal network transferring operation. As a result, the destination node continues to operate as normal while diagnostics are performed at the diagnostic node. According to an embodiment, loop-back frames are forwarded to a diagnostic node that is capable of performing detailed diagnostics. For example, a diagnostic node is a computer workstation that is designed to analyze frames of data and network payload. According to an embodiment, the present invention allows selective loop-back of frames as opposed to the loop-back of all frames. It is to be appreciated that that present invention may be adopted for different types of packet-based networks, such as Ethernet, wide area network, and the Internet. For example, the embodiment can be implemented in accordance with FIGS. 1-3.

It is to be appreciated that the present invention provides various advantages over conventional techniques. According to certain embodiments, a packet-based network continues its normal operations when a loop-back operation is performed. For example, the original destination node receives forwarded frames as a part of the normal network transferring operation. As a result, the destination node continues to operate as normal while diagnostics are performed at the diagnostic node. According to an embodiment, loop-back frames are forwarded to a diagnostic node that is capable of performing detailed diagnostics. For example, a diagnostic node is a computer workstation that is designed to analyze frames of data and network payload. According to an embodiment, the present invention allows selective loop-back of frames as opposed to the loop-back of all frames. It is to be appreciated that that present invention may be adopted for different types of packet-based networks, such as Ethernet, wide area network, and the Internet. For example, the embodiment can be implemented in accordance with FIGS. 1-3.

It is understood the examples and embodiments described herein are for illustrative purposes only and that various modifications or changes in light thereof will be suggested to persons skilled in the art and are to be included within the spirit and purview of this application and scope of the appended claims.

What is claimed is:

1. A method for transferring data in a packet-based network, the method comprising:
   receiving at a loop-back node at least a first data frame, the first data frame being associated with a first origination node and a first destination node;
   processing information associated with the first data frame;
   determining whether the first data frame satisfies at least one predetermined condition based on at least the information associated with the first data frame;
   if the first data frame is determined to satisfy the at least one predetermined condition,
      providing a second data frame based on at least the information associated with the first data frame, the second data frame being associated with a second origination node and a second destination node;
      sending the second data frame to the second destination node;
   wherein the first destination node and the second destination node are different,
   wherein the first data frame includes a first header, the first header including a first source address, a first destination address, and a first indicator indicating the first data frame is a customer payload data frame,
   wherein the second data frame includes a second header, the second data frame including a second source address, a second destination address, and a second indicator indicating the second data frame is a loop-back customer payload frame, and
   wherein the second indicator corresponds to an OpCode.

2. The method of claim 1 wherein sending the second data frame to the second destination node comprises: sending the second data frame to a third node; and sending the second data frame from the third node to the second destination node.

3. The method of claim 1 wherein the second data frame is encapsulated with a new destination address.

4. The method of claim 3 wherein the new destination address is a source node address in the first data frame.

5. The method of claim 3 wherein the new destination address is an address of a third-party node.

6. The method of claim 1 wherein the second data frame is encapsulated with a source address, the source address being different from an origination address of the first data frame.

7. The method of claim 1 further comprising associating the second data frame with a data type.

8. The method of claim 7 wherein the data type is EtherType.

9. The method of claim 7 wherein the data type is DataType.

10. The method of claim 1 wherein the first origination node and the first destination node are routers.

11. The method of claim 1 wherein the first origination node and the first destination node are switches.

12. The method of claim 1, further comprising sending the first data frame to the first destination node if the first data frame is determined to satisfy the at least one predetermined condition.

13. The method of claim 1, further comprising sending the first data frame to the first destination node if the first data frame is determined not to satisfy the at least one predetermined condition.

14. The method of claim 1 wherein the second destination node is a diagnostic node.

15. The method of claim 1, further comprising: receiving the second data frame at the second destination node; and performing diagnostics to the second data frame at the second destination node.

16. The method of claim 1, further comprising:
   receiving the second data frame;
   processing information associated with the second data frame; and
   performing diagnostics to the first data frame based on at least the information associated with the second data frame.

17. The method of claim 1 wherein the first origination node and the second origination node are different.

18. The method of claim 1 wherein: the first data frame includes first data; the second data frame includes second data; and the first data and the second data are the same.

19. The method of claim 1 wherein the determining whether the first data frame satisfies at least one predetermined condition comprises if an address of the first origination node is the same as a predetermined address, determining the first data frame satisfies the at least one predetermined condition.

20. The method of claim 1 wherein the determining whether the first data frame satisfies at least one predetermined condition comprises if an address of the first destination node is the same as a predetermined address, determining the first data frame satisfies the at least one predetermined condition.

21. The method of claim 1 wherein the first data frame is at least a part of a data packet.

22. The method of claim 1 wherein the second destination node is the same node as the first origination node.

23. The method of claim 1 wherein:
   the first source address is associated with the first origination node;
   the first destination address is associated with the first destination node;
   the second source address is associated with the second origination node; and
   the second destination address is associated with the second destination node.

24. The method of claim 23 wherein the first destination address and the second destination address are different.

25. The method of claim 23 wherein the first origination address and the second origination address are different.

26. The method of claim 1 wherein providing a second data frame comprises modifying the first header to generate the second header.

27. The method of claim 1, further comprising: processing information associated with the second data frame; and determining whether the second data frame includes at least one error.

28. The method of claim 1, further comprising receiving at least the predetermined condition.

29. The method of claim 1 wherein the packet-based network is an Ethernet network.

30. The method of claim 1 wherein the packet-based network is an Internet.

31. The method of claim 1, wherein the first source address is the sane as the second destination address.

32. The method of claim 1, wherein the OpCode distinguishes the second data frame from the first data frame.

33. A method for transferring data in a packet-based network, the method comprising:
receiving a plurality of first data frames by a first node directly from a second node, wherein the first data frames are customer payload data frames;
selecting at least some of the first frames based on a destination address, a source address, a VLAN-ID (VID), or combinations thereof;
providing a plurality of second data frames based on the selected data frames, wherein the second data frames are encapsulated using a header comprising an OpCode indicating the second data frames are a loop-back customer payload frames;
sending the second data frames from the first node directly to a third node; and
sending the first data frames from the first node directly to a fourth node;
wherein the third node is different from the second node.

34. The method of claim 33 wherein the third node is different from the fourth node.

35. The method of claim 33 wherein the second node is different from the fourth node.

36. The method of claim 33 wherein: the first data frames include first data; the second data frames include second data; and the first data and the second data are the same.

37. The method of claim 33 wherein:
the first data frames include a first header, the first header including a first source address, a first destination address, and a first indicator indicating the first data frame is a first frame type; and
the second data frame includes a second header, the second data frame including a second source address, a second destination address, and a second indicator indicating the second data frame is a second frame type.

38. The method of claim 37 wherein the first destination address and the second destination address are different.

39. The method of claim 37 wherein the first source address and the second source address are different.

40. The method of claim 33, further comprising: receiving the second data frame; and performing diagnostics to the second data frame.

41. The method of claim 33, further comprising: receiving the second data frame; processing information associated with the second data frame; and performing diagnostics to the first data frame based on at least the information associated with the second data frame.

42. A packet-based network, the network comprising:
a plurality of nodes, wherein one of the nodes comprises hardware and is configured to:
receive at least a first data frame, the first data frame being associated with a first origination node and a first destination node, wherein the first data frame is a customer payload data frame;
process information associated with the first data frame;
determine whether the first data frame satisfies at least one predetermined condition based on at least the information associated with the first data frame;
if the first data frame is determined to satisfy the at least one predetermined condition,
generate a second data frame based on at least the information associated with the first data frame, the second data frame being associated with a second origination node and a second destination node, wherein the second data frame comprises an OpCode indicating the second data frame is a loop-back customer payload frame; and
send the second data frame to the second destination node;
wherein the first destination node and the second destination node are different; and
if the first data frame is determined not to satisfy the at least one predetermined condition, sending the first data frame to the first destination node without generating the second data frame.

43. A communication device including a non-transitory computer-readable medium including instructions for transferring data in a packet-based network, the computer-readable medium comprising:
one or more instructions for receiving at least a first data frame, the first data frame being associated with a first origination node and a first destination node, wherein the first data frame is a customer payload data frame;
one or more instructions for processing information associated with the first data frame;
one or more instructions for determining whether the first data frame satisfies at least one predetermined condition based on at least the information associated with the first data frame;
if the first data frame is determined to satisfy the at least one predetermined condition, one or more instructions for
providing a second data frame based on at least the information associated with the first data frame, the second data frame being associated with a second origination node and a second destination node and comprising an OpCode indicating the second data frame is a loop-back customer payload frame;
sending the second data frame to the second destination node;
wherein the first destination node and the second destination node are different; and
if the first data frame is determined not to satisfy the at least one predetermined condition, sending the first data frame to the first destination node without providing the second data frame.

44. A packet-based network, the network comprising:
a first node configured to send at least a first data frame, wherein the first data frame is a customer payload data frame;
a second node configured to:
receive at least the first data frame directly from the first node;
process information associated with the first data frame;
provide a second data frame based on at least the information associated with the first data frame;
encapsulate the second date frame using an OpCode indicating the second data frame is a loop-back customer payload frame;
send the second data frame without using a tunnel;
send the first data frame;
a third node configured to receive the second data frame directly from the second node; and
a fourth node configured to receive the first data frame directly from the second node;
wherein the third node is different from the first node.

45. The method of claim 44 wherein the third node is different from the fourth node.

46. The method of claim 44 wherein the second node is different from the fourth node.

47. A node comprising hardware and configured to:
receive a plurality of connectionless frames each comprising a destination address;
filter some but not all of the frames, wherein the filtered frames meet a predetermined condition comprising the destination address, a source address, a VLAN-ID (VID) or combinations thereof;
mirror the filtered frames;
send the mirrored frames to the destination address in the frames;
encapsulate the filtered frames such that the encapsulated frames comprise an OpCode indicating the encapsulated frames are loop-back customer payload frames; and
reflect the encapsulated frames to a second destination address that is different from the destination address in the frames.

48. The method of claim 47, wherein the reflected frames are not associated with a tunnel.

49. The method of claim 47, wherein the frames each further comprise the source address, and wherein the encapsulated frames further comprise a second source address that is different from the source address.

50. A method implemented in a network component, the method comprising:
receiving a plurality of frames each comprising a destination address;
selecting at least some of the frames, wherein the selected frames are frames that meet a predetermined condition comprising the first destination address, a source address, a VLAN-ID (VID), or combinations thereof;
mirroring the selected frames;
reflecting either the selected frames or the mirrored frames to a location that is not the destination address, wherein the reflected frames are encapsulated to comprise an OpCode indicating the selected frames or the mirrored frames are loop-back customer payload frames; and
sending the unreflected frames to the destination address.

51. The method of claim 50, wherein the reflected frames are not associated with a tunnel.

52. The method of claim 51,
wherein the frames each further comprise the source address, and
wherein the encapsulated frames further comprise a second source address that is different from the source address.

53. A method implemented in a network component comprising:
receiving a plurality of frames each comprising a first destination address;
filtering some but not all of the frames using a predetermined condition, wherein the predetermined condition comprises the first destination address, a source address, a VLAN-ID (VID), or combinations thereof;
mirroring the filtered frames;
allowing the mirrored frames to proceed to the first destination address;
encapsulating filtered frames with a new header comprising a second destination address that is different from the first destination address and an OpCode indicating the encapsulated frames are loop-hack customer payload frames; and
reflecting the encapsulated frames to the second destination address.

54. The method of claim 53,
wherein the frames each further comprise the source address, and
wherein the new header further comprises a second source address that is different from the source address.

55. The method of claim 54, wherein the reflected frames are not associated with a tunnel.

* * * * *